United States Patent
Iqbal et al.

(10) Patent No.: US 12,423,953 B2
(45) Date of Patent: Sep. 23, 2025

(54) DISTANCE DETERMINATION FROM IMAGE DATA

(71) Applicant: Ford Global Technologies, LLC, Dearborn, MI (US)

(72) Inventors: Zafar Iqbal, Hayward, CA (US); Hitha Revalla, San Jose, CA (US); Apurbaa Mallik, Sunnyvale, CA (US); Gurjeet Singh, Castro Valley, CA (US); Vijay Nagasamy, Fremont, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 562 days.

(21) Appl. No.: 17/854,720

(22) Filed: Jun. 30, 2022

(65) Prior Publication Data

US 2024/0005637 A1    Jan. 4, 2024

(51) Int. Cl.
*G06V 10/764* (2022.01)
*G01C 21/00* (2006.01)
(Continued)

(52) U.S. Cl.
CPC ..... *G06V 10/7715* (2022.01); *G01C 21/3807* (2020.08); *G06V 10/764* (2022.01); *G06V 10/94* (2022.01); *G06V 20/58* (2022.01); *G06V 20/64* (2022.01); *B60W 60/001* (2020.02); *B60W 2420/403* (2013.01)

(58) Field of Classification Search
CPC .. G06V 10/7715; G06V 10/764; G06V 10/94; G06V 20/58; G06V 20/64; G06V 20/56; G06V 10/82; G01C 21/3807; B60W 60/001; B60W 2420/403; G06T 7/579; G06T 2207/10016; G06T 2207/20081; G06T 2207/20084; G06N 3/0455; G06N 3/0464; G06N 3/088; G06N 3/09
See application file for complete search history.

(56) References Cited

U.S. PATENT DOCUMENTS 11,120,292 B2    9/2021  Takeyasu
2019/0318492 A1  10/2019  Kim et al.
(Continued)

FOREIGN PATENT DOCUMENTS

CN    111310574 A      6/2020
KR    20170014916 A    2/2017
(Continued)

OTHER PUBLICATIONS

Zhu, J., et al., "Learning Object-Specific Distance From a Monocular Image," NYU Multimedia and Visual Computing Lab, USA, et al., Sep. 9, 2019, 10 pages.
(Continued)

*Primary Examiner* — Sheela C Chawan
(74) *Attorney, Agent, or Firm* — Frank A. Mackenzie; Brooks Kushman P.C.

(57) ABSTRACT

A computer includes a processor and a memory, and the memory stores instructions executable by the processor to receive an image frame from a camera, generate a feature map from the image frame, generate a depth map from the feature map, classify an object in the image frame based on the feature map, and estimate a distance to the object based on the depth map and based on an input to generating the feature map.

19 Claims, 4 Drawing Sheets

(51) Int. Cl.
  *G06V 10/77* (2022.01)
  *G06V 10/94* (2022.01)
  *G06V 20/58* (2022.01)
  *G06V 20/64* (2022.01)
  *B60W 60/00* (2020.01)

(56) References Cited

U.S. PATENT DOCUMENTS

| | | | |
|---|---|---|---|
| 2020/0050202 A1* | 2/2020 | Suresh | G06V 20/00 |
| 2020/0160546 A1* | 5/2020 | Gu | G06T 3/18 |
| 2020/0262350 A1 | 8/2020 | Takhirov et al. | |
| 2021/0209381 A1 | 7/2021 | Boston et al. | |
| 2022/0301202 A1* | 9/2022 | Park | G06N 3/04 |
| 2022/0343525 A1* | 10/2022 | Garg | G06N 3/045 |

FOREIGN PATENT DOCUMENTS

| | | |
|---|---|---|
| WO | 2014199929 A1 | 12/2014 |
| WO | 2020135447 A1 | 7/2020 |

OTHER PUBLICATIONS

Li, Z. et al., "NPL—MegaDepth: Learning Single-View Depth Prediction from Internet Photos," Department of Computer Science & Cornell Tech, Cornell University, Nov. 28, 2018, 10 pages.
Mallik, A., et al., "Real-time Detection and Avoidance of Obstacles in the Path or Autonomous Vehicles Using Monocular RGB Camera 2022-01-0074," www,sae.org, Mar. 29, 2022, 2 pages.

* cited by examiner

DISTANCE DETERMINATION FROM IMAGE DATA

BACKGROUND

Vehicles typically include sensors. The sensors can provide data about operation of the vehicle, for example, wheel speed, wheel orientation, and engine and transmission data (e.g., temperature, fuel consumption, etc.). The sensors can detect the location and/or orientation of the vehicle. The sensors can be global positioning system (GPS) sensors; accelerometers such as piezo-electric or microelectromechanical systems (MEMS); gyroscopes such as rate, ring laser, or fiber-optic gyroscopes; inertial measurements units (IMU); and/or magnetometers. The sensors can detect the external world, e.g., objects and/or characteristics of surroundings of the vehicle, such as other vehicles, road lane markings, traffic lights and/or signs, pedestrians, etc. For example, the sensors can be radar sensors, scanning laser range finders, light detection and ranging (lidar) devices, and/or image processing sensors such as cameras.

DETAILED DESCRIPTION

Figure 1:
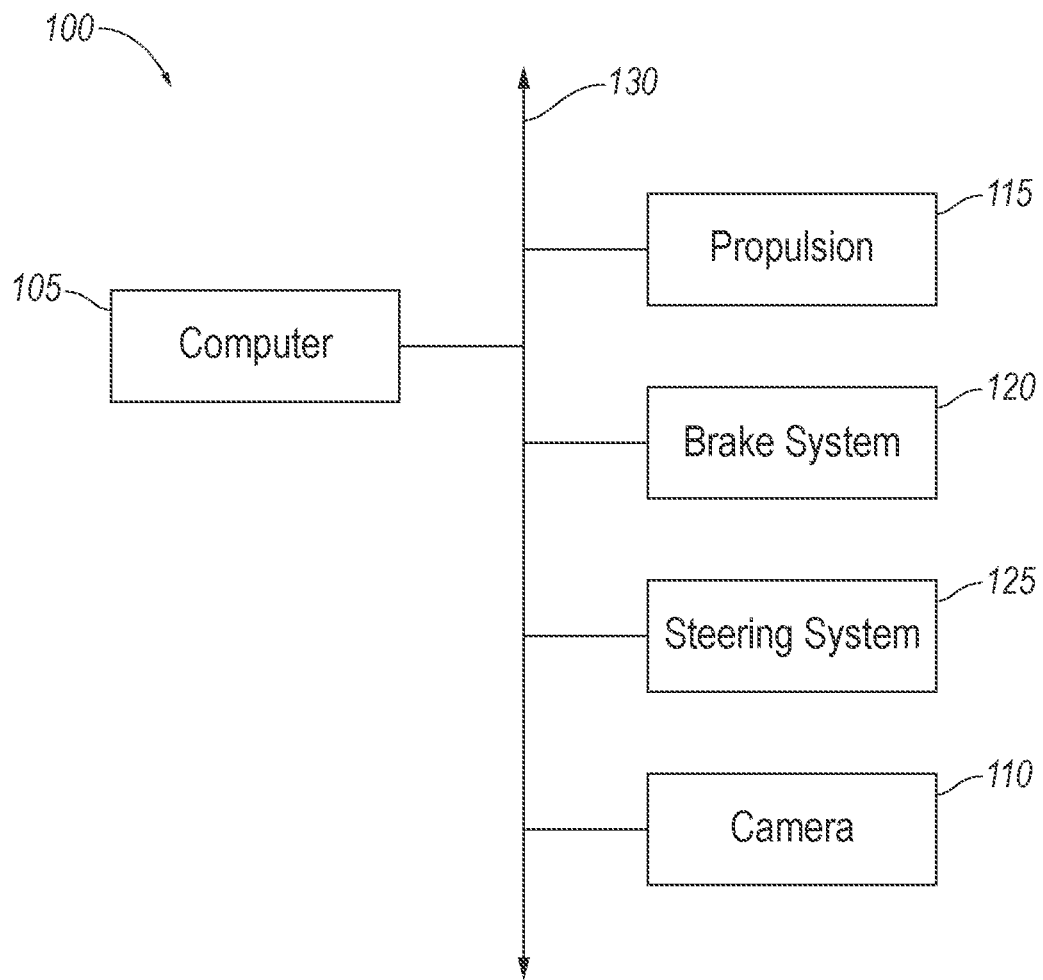
FIG. 1 is a block diagram of an example vehicle.

This disclosure provides techniques for determining a distance from a camera to an object using image data from the camera. The camera can be, e.g., mounted on a vehicle. Specifically, the techniques are able to use monocular image data, i.e., image data from a single camera rather than a stereo pair of cameras. The techniques can include generating a feature map from an image frame from the camera, generating a depth map from the feature map, classifying an object in the image frame based on the feature map, and estimating a distance to the object based on the depth map and based on an input to generating the feature map. The input to generating the feature map can be, e.g., the image frame or an intermediate output of a machine-learning program used to generate the feature map.

The techniques may provide greater accuracy than previous techniques for determining distance from images. Previous techniques are often highly sensitive to intrinsic and extrinsic calibration of the camera, but the techniques herein are independent of the calibration of the camera, as well as independent of the placement of the camera on the vehicle. The greater accuracy and reduced sensitivity can thus permit a vehicle to forego other sensors for detecting distance, such as radar or lidar sensors, in favor of the cameras, or to gain increased accuracy by fusing the determined distances from the image data with data from radar and/or lidar sensors. Moreover, the techniques can provide efficient data structures for the distance determination. The feature map can be reused for different purposes, e.g., both for generating the depth map and thereby the distance and for classifying the object, as well as for segmentation, lane detection, etc.

A computer includes a processor and a memory, and the memory stores instructions executable by the processor to receive an image frame from a camera, generate a feature map from the image frame, generate a depth map from the feature map, classify an object in the image frame based on the feature map, and estimate a distance to the object based on the depth map and based on an input to generating the feature map.

The instructions may further include instructions to actuate a vehicle component based on the distance to the object.

The input to generating the feature map may be the image frame. The instructions may further include instructions to combine the image frame and the depth map into a multichannel image, the multichannel image including one channel for depth and a plurality of channels for respective colors.

The instructions to estimate the distance may include instructions to execute a machine-learning program, and the depth map and the input to generating the feature map may be inputted to the machine-learning program.

The instructions to generate the feature map may include instructions to execute a machine-learning program organized as a series of layers, and the input to generating the feature map may be an intermediate output of one of the layers that is passed to a next one of the layers. The machine-learning program may be a first machine-learning program, the instructions to estimate the distance may include instructions to execute a second machine-learning program organized as a series of layers, and the intermediate output may be inputted to the second machine-learning program at an intermediate position among the layers of the second machine-learning program. The depth map may be inputted to a first-executing layer of the layers of the second machine-learning program.

The depth map may be an ordinal depth map.

The instructions may further include instructions to store the input to generating the feature map in a queue until the depth map is generated, and estimating the distance to the object may be based on the input to generating the feature map received from the queue.

The instructions may further include instructions to detect a location of the object in the image frame. The instructions to detect the location of the object in the image frame may include instructions to generate pixel coordinates defining a bounding box around the object. Estimating the distance to the object may be based on the coordinates of the bounding box.

The instructions to classify the object may include instructions to execute a first machine-learning program, the instructions to detect the location of the object may include instructions to execute a second machine-learning program, and the feature map may be inputted to the first machine-learning program and to the second machine-learning program.

The instructions may further include instructions to generate a plurality of bounding boxes for a plurality of objects including the object. The instructions may further include instructions to pool a collective area circumscribed by the bounding boxes into a single channel, the instructions to estimate the distance may include instructions to execute a machine-learning program, and the single channel of the collective area may be inputted to the machine-learning program. The machine-learning program may be organized as a series of layers, the input to generating the feature map may be inputted to the machine-learning program, and the single channel of the collective area may be inputted to a later-executing layer of the machine-learning program than the input to generating the feature map is inputted to.

The instructions to classify the object may include instructions to execute a machine-learning program, and the feature map may be inputted to the machine-learning program.

The image frame may be a monocular image frame.

A method includes receiving an image frame from a camera, generating a feature map from the image frame, generating a depth map from the feature map, classifying an object in the image frame based on the feature map, and estimating a distance to the object based on the depth map and based on an input to generating the feature map.

With reference to the Figures, wherein like numerals indicate like parts throughout the several views, a computer 105 of a vehicle 100 includes a processor and a memory, and the memory stores instructions executable by the processor to receive an image frame 200 from a camera 110, generate a feature map 205 from the image frame 200, generate a depth map 210 from the feature map 205, classify an object in the image frame 200 based on the feature map 205, and estimate a distance to the object based on the depth map 210 and based on an input to generating the feature map 205.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous or semi-autonomous vehicle. The computer 105 can be programmed to operate the vehicle 100 independently of the intervention of a human operator, completely or to a lesser degree. The computer 105 may be programmed to operate a propulsion system 115, a brake system 120, a steering system 125, and/or other vehicle systems based in part on the image frames 200 from the camera 110. For the purposes of this disclosure, autonomous operation means the computer 105 controls the propulsion system 115, brake system 120, and steering system 125 without input from a human operator; semi-autonomous operation means the computer 105 controls one or two of the propulsion system 115, brake system 120, and steering system 125 and a human operator controls the remainder; and nonautonomous operation means a human operator controls the propulsion system 115, brake system 120, and steering system 125. Semi-autonomous operation includes using advanced driver assistance systems (ADAS). ADAS are groups of electronic technologies that assist drivers in driving and parking functions. Examples of ADAS include forward collision warning, lane-departure warning, blind-spot warning, automatic emergency braking, adaptive cruise control, and lane-keeping assistance.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) or Verilog is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 130 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the propulsion system 115, the brake system 120, the steering system 125, the camera 110, and other components via the communications network 130.

The propulsion system 115 of the vehicle 100 generates energy and translates the energy into motion of the vehicle 100. The propulsion system 115 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 115 can include an electronic control unit (ECU) or the like that is in communication with and receives input from the computer 105 and/or a human operator. The human operator may control the propulsion system 115 via, e.g., an accelerator pedal and/or a gear-shift lever.

The brake system 120 is typically a conventional vehicle braking subsystem and resists the motion of the vehicle 100 to thereby slow and/or stop the vehicle 100. The brake system 120 may include friction brakes such as disc brakes, drum brakes, band brakes, etc.; regenerative brakes; any other suitable type of brakes; or a combination. The brake system 120 can include an electronic control unit (ECU) or the like that is in communication with and receives input from the computer 105 and/or a human operator. The human operator may control the brake system 120 via, e.g., a brake pedal.

The steering system 125 is typically a conventional vehicle steering subsystem and controls the turning of the wheels. The steering system 125 may be a rack-and-pinion system with electric power-assisted steering, a steer-by-wire system, as both are known, or any other suitable system. The steering system 125 can include an electronic control unit (ECU) or the like that is in communication with and receives input from the computer 105 and/or a human operator. The human operator may control the steering system 125 via, e.g., a steering wheel.

The camera 110 can detect electromagnetic radiation in some range of wavelengths. For example, the camera 110 may detect visible light, infrared radiation, ultraviolet light, or some range of wavelengths including visible, infrared, and/or ultraviolet light. For example, the camera 110 can be a charge-coupled device (CCD), complementary metal oxide semiconductor (CMOS), or any other suitable type.

Figure 2A:
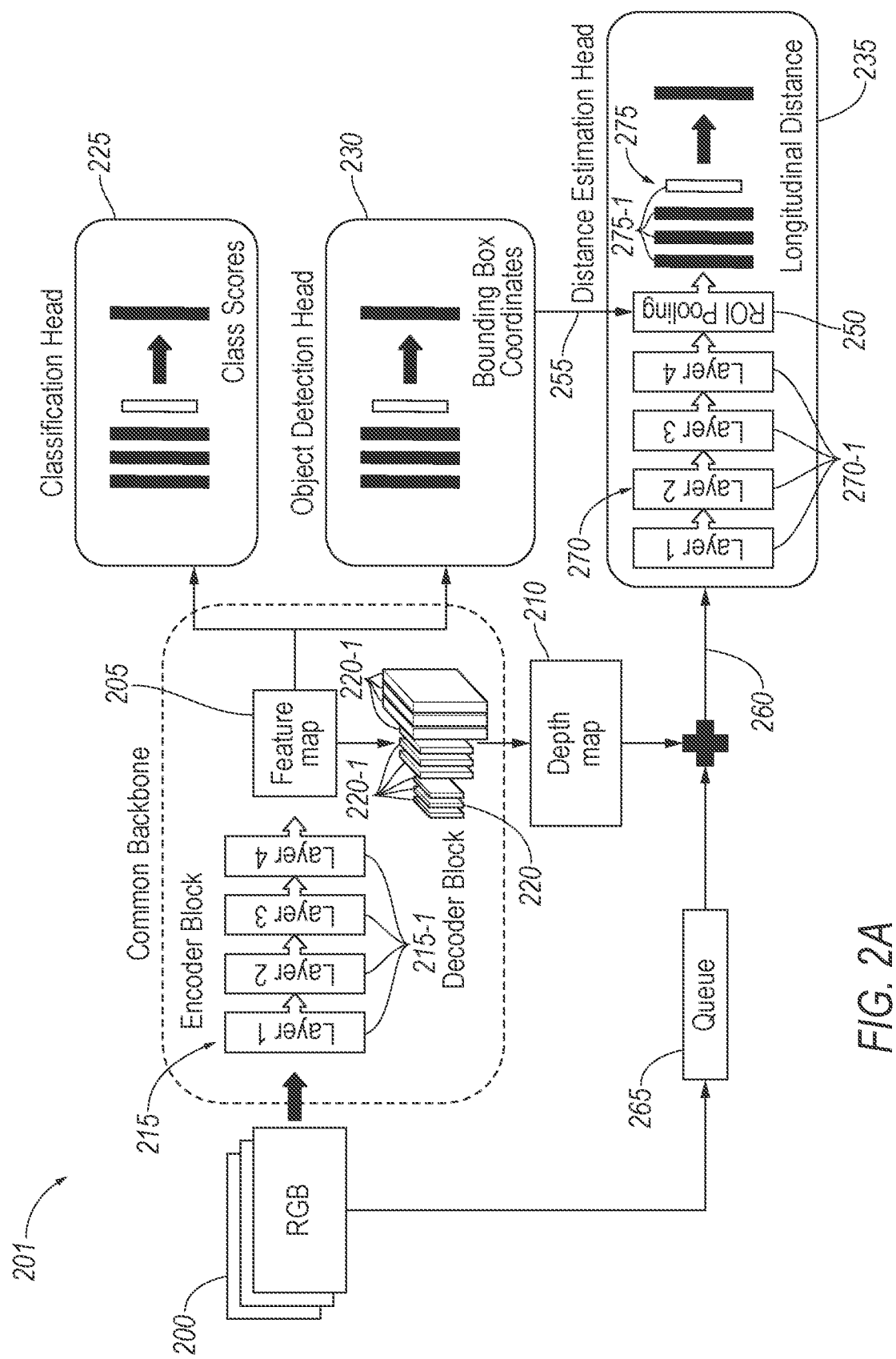
FIG. 2A is a diagram of an example set of machine-learning programs for estimating a distance to an object in an image frame.
Figure 2B:
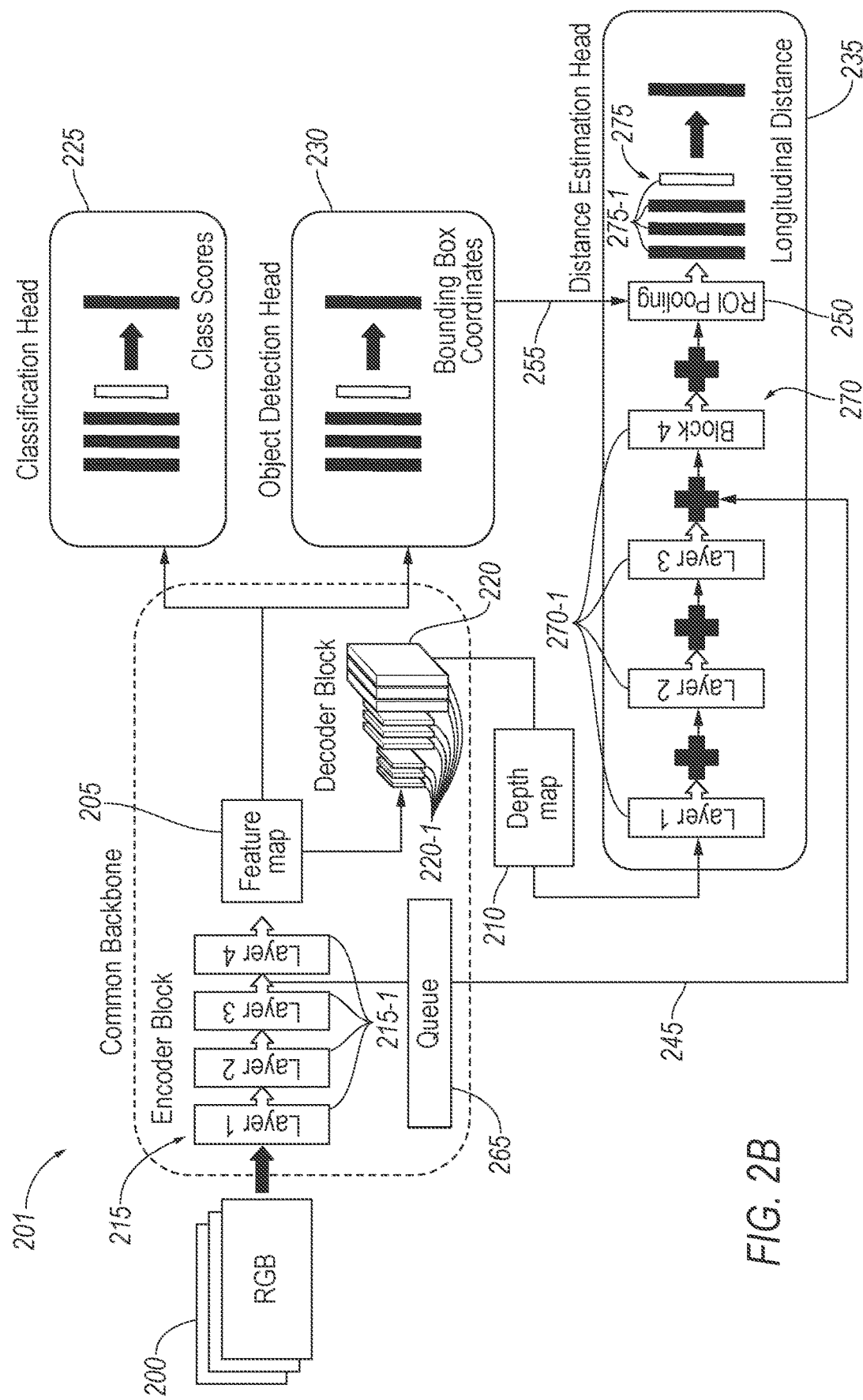
FIG. 2B is a diagram of another example set of machine-learning programs for estimating the distance to the object.

With reference to FIGS. 2A-B, the computer 105 is programmed to receive image data from the camera 110. The image data are a sequence of the image frames 200 of the field of view of the camera 110. Each image frame 200 is a two-dimensional matrix of pixels, e.g., 1280 pixels wide by 720 pixels tall. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in the image frame 200, i.e., position in the field of view of the camera 110 at the time that the image frame 200 was recorded, can be specified in pixel dimensions or coordinates, e.g., an ordered pair of pixel distances, such as a number of pixels from a top edge and a number of pixels from a left edge of the field of view. The image frame 200 is a monocular image frame, i.e., from a single camera 110 that is not part of a pair of stereo cameras.

The computer 105 may be programmed with an architecture 201 to perform multiple tasks using the image frame 200 as the input, e.g., classify objects in the image frame 200, detect locations 255 of the objects, estimate distances to the objects, etc., as will each be described below. The architecture 201 includes multiple machine-learning programs arranged such that outputs of some of the machine-learning programs serve as inputs to other of the machine-learning programs, as will be described below.

The computer 105 is programmed to generate the feature map 205 from one of the image frames 200. A feature map 205 provides locations in an image, e.g., in pixel coordinates, of features of interest such as edges of objects. The feature map 205 has a reduced dimensionality compared to the image frame 200.

Generating the feature map 205 can include executing a first machine-learning program 215 organized as a series of layers 215-1. For example, the first machine-learning program 215 may be or include an artificial neural network such as a residual neural network (ResNet). For example, the first machine-learning program 215 may be an encoder block that reduces a dimensionality of the data from one layer 215-1 to the next layer 215-1.

The first machine-learning program 215 may be trained jointly with the rest of the architecture 201. For example, the architecture 201 may be trained using images annotated with data corresponding to the final outputs of the architecture 201 to serve as ground truth, e.g., classifications of the objects in the image, locations of the objects in the images, distances to the objects in the images, etc. The joint training can use a combined loss function over the multiple outputs. Alternatively, the first machine-learning program 215 may be trained separately using images and corresponding ground-truth feature maps. Alternatively, the first machine-learning program 215 may be trained jointly with a portion of the rest of the architecture 201, e.g., with a second machine-learning program 220 described below for generating the depth map 210. Alternatively, the first machine-learning program 215 may be trained separately as described and then further trained jointly with the rest of the architecture 201 as described.

The computer 105 can be programmed to generate the depth map 210 from the feature map 205. The depth map 210 can be an image containing information relating to distances of surfaces in the environment from the camera 110. For example, each pixel can have a depth value. The depth value can be a unitless scalar value specifying the depth, e.g., ranging from 1 for closest to 0 for farthest (or vice versa). The depth map 210 can be an ordinal depth map, i.e., the depth information such as the depth values can specify a rank ordering of depth but not a relative quantity of depth, e.g., a depth value of 0.25 may be farther from the camera 110 than a depth value of 0.5 but not necessarily twice as far. The depth map 210 can be the same pixel size as the image frame 200, e.g., 1280×720 pixels. The depth map 210 can be a pixelwise depth map corresponding to the image frame 200, i.e., each pixel of the depth map 210 can have a depth value for the pixel having the same pixel coordinates in the image frame 200.

Generating the depth map 210 can include executing a second machine-learning program 220. The feature map 205 can be the input to the second machine-learning program 220, and the depth map 210 can be the output from the second machine-learning program 220. The second machine-learning program 220 can be any suitable algorithm for generating the depth map 210 from the feature map 205. For example, the second machine-learning program 220 may be a decoder block that increases a dimensionality of the data from one layer 220-1 of the second machine-learning program 220 to the next layer 220-1 of the second machine-learning program 220, e.g., so that the depth map 210 has a same dimensionality as the image frame 200, e.g., so that both the depth map 210 and the image frame 200 have a size of 1280×720 pixels The second machine-learning program 220 can be jointly trained with the first machine-learning program 215. For example, the first machine-learning program 215 and the second machine-learning program 220 can together be a deep neural network using an encoder-decoder architecture. The encoder-decoder architecture has the advantage of extracting the relevant features from the image frame 200 for the feature map 205 and then building those features in the feature map 205 into the depth map 210 having the same scale as the image frame 200. The deep neural network, i.e., the combination of the first machine-learning program 215 and the second machine-learning program 220, can be trained on a dataset containing images with corresponding depth information, e.g., both Euclidean distance information and ordinal depth information. One such publicly available dataset is the MegaDepth dataset. After training, the encoder block of the encoder-decoder architecture can become the first machine-learning program 215 and the decoder block of the encoder-decoder architecture can become the second machine-learning program 220.

The computer 105 can be programmed to classify the objects in the image frame 200, i.e., to determine a type of each object in the image frame 200. The type can be selected from a preset list of types, e.g., {pedestrian, bicycle, motorcycle, motor vehicle, pole, bush, . . . }. The classification can be based on the feature map 205.

Determining the types of the objects can include executing a third machine-learning program 225. The feature map 205 can be inputted to the third machine-learning program 225. The third machine-learning program 225 can be any suitable algorithm for object recognition, e.g., a regression network. The dataset on which the third machine-learning program 225 is trained can include labels of the types of the objects in the images of the dataset. The preset list of types can be generated as a result of training the third machine-learning program 225, e.g., using unsupervised learning, or the preset list can be generated in advance of training the third machine-learning program 225 using supervised learning.

The third machine-learning program 225 can be jointly trained with the rest of the architecture 201, as described above, or with a portion of the rest of the architecture, e.g., the first machine-learning program 215 and possibly also with the second machine-learning program 220. Alternatively, the first machine-learning program 215 may be trained first, and then the third machine-learning program 225 may be trained with the first machine-learning program 215. The third machine-learning program 225 may be trained using images annotated with data indicating the classifications of the objects in the images.

The computer 105 can be programmed to detect a location 255 of at least one object, e.g., a plurality of locations 255 for a plurality of objects, in the image frame 200. Detecting the locations 255 of the objects can be based on the feature map 205. Detecting the locations 255 of the objects can include executing a fourth machine-learning program 230. The feature map 205 can be inputted to the fourth machine-learning program 230, and the fourth machine-learning program 230 can output a plurality of bounding boxes for the objects. Each bounding box can be defined by, e.g., pixel coordinates of opposite corners of the bounding box. The fourth machine-learning program 230 can be any suitable algorithm for detecting the locations 255 of the objects in the image frame 200. For example, the fourth machine-learning program 230 can be a feature pyramid network, which performs well at object detection. The fourth machine-learning program 230 can be trained on a dataset containing feature maps 205 generated from images of the same pixel size as the image frame 200, e.g., 1280×720, that are encoded with locations of the objects in pixel coordinates. For example, the fourth machine-learning program 230 may be jointly trained with the first machine-learning program 215, e.g., using a combined loss of the fourth machine-learning program and the first machine-learning program 215. Alternatively, the first machine-learning program 215 may be trained first, and then the fourth machine-learning program 230 may be trained with the first machine-learning program 215. The fourth machine-learning program 230 may be trained using images annotated with data indicating the locations, e.g., the bounding boxes.

The computer 105 is programmed to estimate a distance to the object based on the depth map 210, based on an input to generating the feature map 205, and based on the locations 255 of the objects in the image frame 200. The input to generating the feature map 205 is data that the computer 105 uses when generating the feature map 205 and will be described in more detail below. Determining the distances can include executing a fifth machine-learning program 235. The depth map 210, the input to generating the feature map 205, and the locations 255 of the objects in the image frame 200 can be inputted to the fifth machine-learning program 235. Distances from the camera 110 to the objects can be the output of the fifth machine-learning program 235. The distances can be cardinal values in units of distance, e.g., meters. The fifth machine-learning program 235 can be any suitable type for determining distances. For example, the fifth machine-learning program 235 may include a distance regressor, which is well-suited to estimating distances. The fifth machine-learning program 235 can be organized as a series of layers. The layers of the fifth machine-learning program 235 may include a first set 270 of layers 270-1 and a second set 275 of layers 275-1 following the first set 270. The first set 270 may be a residual neural network for isolating important features, and the second set 275 may be the distance regressor. The fifth machine-learning program 235 can be jointly trained with the first machine-learning program 215 and the second machine-learning program 220 or third machine-learning program 225, e.g., using a combined loss of the fifth machine-learning program 235 and the other machine-learning programs 215, 220, 225, 230. The training dataset can include images as described above with corresponding ground-truth values of the actual distances to the objects in the images.

With reference specifically to FIG. 2A, the input to generating the feature map 205 may be the image frame 200. The image frame 200 and the depth map 210 may be inputted to the fifth machine-learning program 235. For example, the computer 105 may combine the image frame 200 and the depth map 210 into a multichannel image 260. Each channel provides respective scalar values for the pixels of the image frame 200. The image frame 200 can include values for colors, e.g., for three colors, e.g., red, green, and blue. The multichannel image 260 can then include one channel for depth and a plurality of channels for the respective colors, e.g., a four-channel image with channels for depth, red, green, and blue. The image frame 200 and the depth map 210 e.g., as the multichannel image 260, may be inputted to a first-executing layer 270-1 of the layers 270-1, 275-1 of the fifth machine-learning program 235.

With reference specifically to FIG. 2B, the input to generating the feature map 205 may be an intermediate output 245 of one of the layers 215-1 of the first machine-learning program 215 that is passed to a next one of the layers 215-1 of the first machine-learning program 215. The depth map 210 can be inputted to the first-executing layer 270-1 of the layers 270-1, 275-1 of the fifth machine-learning algorithm. The intermediate output 245 is inputted to the fifth machine-learning program 235 at an intermediate position among the layers 270-1 of the first set 270 of the fifth machine-learning program 235. For example, the intermediate output 245 can be inputted after a same number of layers 270-1 in the fifth machine-learning program 235 as the number of layers 215-1 of the first machine-learning program 215 before outputting the intermediate output 245, e.g., if the intermediate output 245 came from the third layer 215-1 of the first machine-learning program 215, then the intermediate output 245 would be inputted after the third layer 270-1 of the fifth machine-learning program 235, i.e., into the fourth layer 270-1 of the fifth machine-learning program 235. The intermediate output 245 can thereby match a dimensionality of the insertion point within the fifth machine-learning program 235 and can have features highlighted or diminished to an extent matching the insertion point within the fifth machine-learning program 235.

Returning to FIGS. 2A-B, estimating the distances to the objects can be based on the locations of the 255 objects, e.g., on the coordinates of the bounding boxes. For example, the computer 105 can be programmed to pool a collective area circumscribed by the bounding boxes into a single channel, i.e., pool the area encompassed by one or more of the bounding boxes into the single channel. The single channel of the collective area can indicate whether pixels of the image frame 200 are in at least one bounding box or are outside the bounding boxes. The single channel of the collective area is inputted to the fifth machine-learning program 235, specifically to a pooling layer 250, which is a later-executing layer of the fifth machine-learning program 235 than the input to generating the feature map 205 is inputted to. In the examples of FIGS. 2A and 2B, the pooling layer 250 is the fifth layer of the fifth machine-learning program 235, after the first-executing layer 270-1 to which the image frame 200 is passed in FIG. 2A and after the fourth layer 270-1 to which the intermediate output 245 is passed in FIG. 2B. For example, the pooling layer 250 may be between the first set 270 and the second set 275 of the layers 270-1, 275-1. The single channel of the collective area is used to reduce the area of the image frame 200 processed after the pooling layer 250 to only the area inside the bounding boxes, reducing processing demands.

The computer 105 may be programmed to store the input to generating the feature map 205 in a queue 265 until the depth map 210 is generated. Estimating the distance to the object can be based on the input to generating the feature map 205 received from the queue 265, e.g., the fifth machine-learning program 235 can receive the input to generating the feature map 205 from the queue 265. The queue 265 can help ensure that fifth machine-learning program 235 is using the depth map 210 corresponding to the same image frame 200 as the input to generating the feature map 205, rather than the depth map 210 from an earlier image frame 200.

Figure 3:
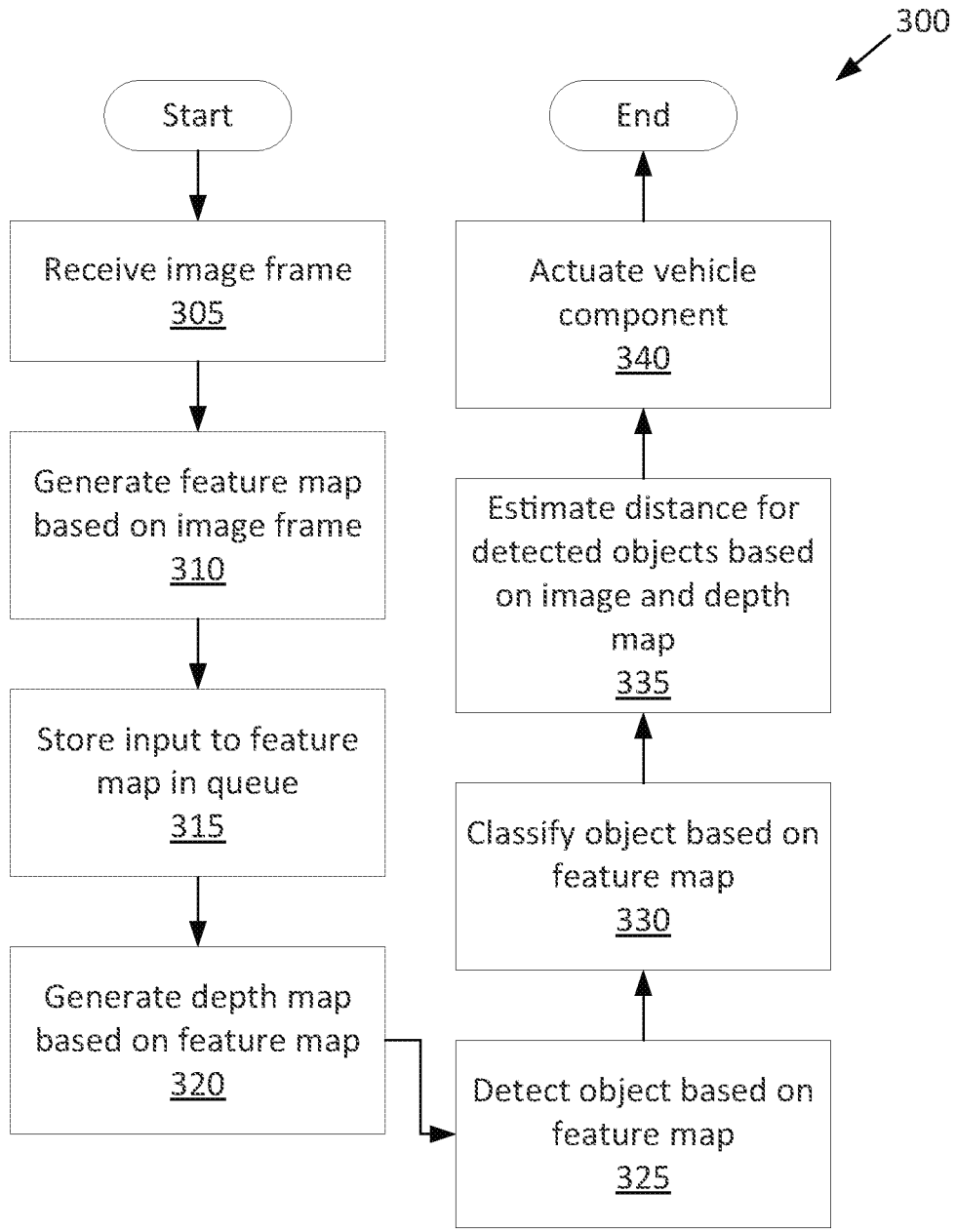
FIG. 3 is a process flow diagram of an example process for estimating the distance to the object.

FIG. 3 is a process flow diagram illustrating an example process 300 for estimating the distances to the objects. The memory of the computer 105 stores executable instructions for performing the steps of the process 300 and/or programming can be implemented in structures such as mentioned above. As a general overview of the process 300, the computer 105 receives the image frame 200; generates the feature map 205 from the image frame 200; stores the input to generating the feature map 205 in the queue 265; generates the depth map 210 from the feature map 205; detects the locations 255 of the objects in the image frame 200; classifies the objects in the image frame 200 based on the feature map 205; estimates the distances to the objects based on the depth map 210, the input to generating the feature map 205 from the queue 265, and the locations 255 of the objects in the image frame 200; and actuates a vehicle component based on the distances.

The process 300 begins in a block 305, in which the computer 105 receives the image frame 200 from the camera 110, as described above.

Next, in a block 310, the computer 105 generates the feature map 205 from the image frame 200, as described above.

Next, in a block 315, the computer 105 stores the input to generating the feature map 205 in the queue 265, as described above.

Next, in a block 320, the computer 105 generates the depth map 210 from the feature map 205, as described above.

Next, in a block 325, the computer 105 detects the locations 255 of the objects in the image frame 200, as described above.

Next, in a block 330, the computer 105 classifies the objects in the image frame 200 based on the feature map 205, as described above.

Next, in a block 335, the computer 105 estimates the distances to the object based on the depth map 210, based on the input to generating the feature map 205 received from the queue 265, and based on the locations 255 of the objects in the image frame 200, as described above.

Next, in a block 340, the computer 105 actuates a vehicle component of the vehicle 100 based on the distances to the objects and/or based on the classifications of the objects (along with data from other sensors). The vehicle component can include, e.g., the propulsion system 115, the brake system 120, and/or the steering system 125. For example, the computer 105 can actuate at least one of the propulsion system 115, the brake system 120, or the steering system 125. For example, the computer 105 may actuate the brake system 120 based on the distances to the objects as part of an automatic-braking feature, e.g., braking to prevent the vehicle 100 from contacting one of the objects in the environment. The computer 105 can, if any of the objects are positioned in front of the vehicle 100 and are within a distance threshold of the vehicle 100, instruct the brake system 120 to actuate. The distance threshold can be chosen based on a stopping distance of the vehicle 100 and may vary with a speed of the vehicle 100. For another example, the computer 105 may operate the vehicle 100 autonomously, i.e., actuating the propulsion system 115, the brake system 120, and the steering system 125 based on the distances, e.g., to navigate the vehicle 100 around the objects in the environment. Autonomously operating the vehicle 100 may also be based on the classifications of the objects, e.g., the computer 105 may navigate the vehicle 100 to provide a larger buffer if the object is a type that moves, e.g., motorcycle, than a type that is stationary, e.g., mailbox. After the block 340, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," etc. are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory, the memory storing instructions executable by the processor to:
receive an image frame from a camera;
generate a feature map from the image frame;
generate a depth map by executing a program to operate on the feature map to produce
the depth map, the depth map being an ordinal depth map that specifies a rank ordering of depth and not a relative quantity of depth;
classify an object in the image frame based on the feature map; and
estimate a distance to the object based on the depth map and based on an input to generating the feature map.

2. The computer of claim 1, wherein the instructions further include instructions to actuate a vehicle component based on the distance to the object.

3. The computer of claim 1, wherein the input to generating the feature map is the image frame.

4. The computer of claim 3, wherein the instructions further include instructions to combine the image frame and the depth map into a multichannel image, the multichannel image including one channel for depth and a plurality of channels for respective colors from the image frame.

5. The computer of claim 3, wherein the instructions to estimate the distance include instructions to execute a machine-learning program, and the depth map and the input to generating the feature map are inputted to the machine-learning program.

6. The computer of claim 1, wherein the instructions to generate the feature map include instructions to execute a machine-learning program organized as a series of layers, and the input to generating the feature map is an intermediate output of one of the layers that is passed to a next one of the layers.

7. The computer of claim 6, wherein the machine-learning program is a first machine-learning program, the instructions to estimate the distance include instructions to execute a second machine-learning program organized as a series of layers, and the intermediate output is inputted to the second machine-learning program at an intermediate position among the layers of the second machine-learning program.

8. The computer of claim 7, wherein the depth map is inputted to a first-executing layer of the layers of the second machine-learning program.

9. The computer of claim 1, wherein the instructions further include instructions to store the input to generating the feature map in a queue until the depth map is generated, and estimating the distance to the object is based on the input to generating the feature map received from the queue.

10. The computer of claim 1, wherein the instructions further include instructions to detect a location of the object in the image frame.

11. The computer of claim 10, wherein the instructions to detect the location of the object in the image frame include instructions to generate pixel coordinates defining a bounding box around the object.

12. The computer of claim 11, wherein estimating the distance to the object is based on the coordinates of the bounding box.

13. The computer of claim 10, wherein the instructions to classify the object include instructions to execute a first machine-learning program, the instructions to detect the location of the object include instructions to execute a second machine-learning program, and the feature map is inputted to the first machine-learning program and to the second machine-learning program.

14. The computer of claim 1, wherein the instructions further include instructions to generate a plurality of bounding boxes for a plurality of objects including the object.

15. The computer of claim 14, wherein the instructions further include instructions to pool a collective area circumscribed by the bounding boxes into a single channel, the instructions to estimate the distance include instructions to execute a machine-learning program, and the single channel of the collective area is inputted to the machine-learning program.

16. The computer of claim 15, wherein the machine-learning program is organized as a series of layers, the input to generating the feature map is inputted to the machine-learning program, and the single channel of the collective area is inputted to a later-executing layer of the machine-learning program than the input to generating the feature map is inputted to.

17. The computer of claim 1, wherein the instructions to classify the object include instructions to execute a machine-learning program, and the feature map is inputted to the machine-learning program.

18. The computer of claim 1, wherein the image frame is a monocular image frame, and estimating the distance to the object is performed without using data from sensors other than the camera.

19. A method comprising:
  receiving an image frame from a camera;
  generating a feature map from the image frame;
  generating a depth map by executing a program to operate on the feature map to produce the depth map, the depth map being an ordinal depth map that specifies a rank ordering of depth and not a relative quantity of depth;
  classifying an object in the image frame based on the feature map; and
  estimating a distance to the object based on the depth map and based on an input to generating the feature map.

* * * * *